(12) United States Patent
Kohli et al.

(10) Patent No.: US 8,213,726 B2
(45) Date of Patent: Jul. 3, 2012

(54) IMAGE LABELING USING MULTI-SCALE PROCESSING

(75) Inventors: Pushmeet Kohli, Cambridge (GB); Carsten Rother, Cambridge (GB); Victor Lempitsky, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 423 days.

(21) Appl. No.: 12/488,119

(22) Filed: Jun. 19, 2009

(65) Prior Publication Data

US 2010/0322525 A1    Dec. 23, 2010

(51) Int. Cl.
*G06K 9/68* (2006.01)
(52) U.S. Cl. ........ 382/226; 382/299; 382/302; 382/100; 382/325
(58) Field of Classification Search .................. 382/100, 382/226, 299, 302, 325
See application file for complete search history.

(56) References Cited

U.S. PATENT DOCUMENTS

| | | | |
|---|---|---|---|
| 6,549,660 B1 * | 4/2003 | Lipson et al. | 382/224 |
| 6,744,923 B1 | 6/2004 | Zabih et al. | |
| 2002/0122596 A1 * | 9/2002 | Bradshaw | 382/226 |
| 2006/0050085 A1 * | 3/2006 | Bossut et al. | 345/629 |
| 2006/0159342 A1 | 7/2006 | Sun et al. | |
| 2007/0047810 A1 | 3/2007 | Grady | |
| 2007/0165949 A1 | 7/2007 | Sinop et al. | |
| 2007/0292049 A1 * | 12/2007 | Liu et al. | 382/299 |
| 2008/0056577 A1 | 3/2008 | Grady et al. | |
| 2008/0310743 A1 | 12/2008 | Rother et al. | |
| 2009/0046951 A1 | 2/2009 | Paragios et al. | |
| 2010/0183225 A1 * | 7/2010 | Vantaram et al. | 382/173 |

OTHER PUBLICATIONS

Blake, et al., "Interactive Image Segmentation using an adaptive GMMRF model", retrieved on May 14, 2009 at http://research.microsoft.com/pubs/67898/eccv04-GMMRF.pdf, Microsoft Research Cambridge UK, 14 pages.

Boros, et al., "Pseudo-Boolean Optimization", retrieved on May 14, 2009 at <<http://rutcor.rutgers.edu/~boros/Papers/2002-DAM-BH.pdf>>, Oct. 15, 2001, 83 pages.

Boykov, et al., "Computing Geodesics and Minimal Surfaces via Graph Cuts", retrieved on May 14, 2009 at <<http://ieeexplore.ieee.org/xpl/freeabs_all.jsp?arnumber=1238310>>, Proceedings of the Ninth IEEE International Conference on Computer Vision (ICCV 2003), 8 pages.

Boykov, et al., "Fast Approximate Energy Minimization via Graph Cuts", retrieved on May 14, 2009 at <<http://ieeexplore.ieee.org/xpl/freeabs_all.jsp?arnumber=969114>>, IEEE Transactions on Pattern Analysis and Machine Intelligence, vol. 23, No. 11, Nov. 2001, pp. 1222-1239.

(Continued)

*Primary Examiner* — Stephen R Koziol
(74) *Attorney, Agent, or Firm* — Lee & Hayes, PLLC

(57) ABSTRACT

Multi-scale processing may be used to reduce the memory and computational requirements of optimization algorithms for image labeling, for example, for object segmentation, 3D reconstruction, stereo correspondence, optical flow and other applications. For example, in order to label a large image (or 3D volume) a multi-scale process first solves the problem at a low resolution, obtaining a coarse labeling of an original high resolution problem. This labeling is refined by solving another optimization on a subset of the image elements. In examples, an energy function for a coarse level version of an input image is formed directly from an energy function of the input image. In examples, the subset of image elements may be selected using a measure of confidence in the labeling.

18 Claims, 10 Drawing Sheets

OTHER PUBLICATIONS

Boykov, et al., "Interactive Graph Cuts for Optimal Boundary & Region Segmentation of Objects in N-D Images", retrieved on May 14, 2009 at <<http://www.csd.uwo.ca/~yuri/Papers/iccv01.pdf>>, Proceedings of "International Conference on Computer Vision", Vancouver, Canada, Jul. 2001, vol. 1, pp. 105-112.

Burt, et al., "The Laplacian Pyramid as a Compact Image Code", retrieved on May 14, 2009 at <<http://web.mit.edu/persci/people/adelson/pub_pdfs/pyramid83.pdf>>, IEEE Transactions on Communications, vol. COM-31, No. 4, Apr. 1983, pp. 532-540.

Delong, et al., "A Scalable Graph-Cut Algorithm for N-D Grids", retrieved on May 14, 2009 at <<http://www.csd.uwo.ca/~adelong3/pub/08-CVPR-maxflow.pdf>>, In IEEE Conference on Computer Vision and Pattern Recognition (CVPR), Anchorage, Jun. 2008, pp. 1-8.

Duchi, et al., "Using Combinatorial Optimization within Max-Product Belief Propagation", retrieved on May 14, 2009 at <<http://pluto.huji.ac.il/~galelidan/papers/ElidanCOMPOSE.pdf>>, Department of Computer Science, Stanford University, CA, 8 pages.

Glocker, et al., "Optical Flow Estimation with Uncertainties through Dynamic MRFs", retrieved on May 14, 2009 at <<http://ieeexplore.ieee.org/stamp/stamp.jsp?arnumber=04587562>>, IEEE 2008, 8 pages.

Greig, et al., "Exact Maximum A Posteriori Estimation for Binary Images", retrieved on May 14, 2009 at <<http://www.maia.ub.es/~cerquide/research/GraphicalModelsForVolumeSegmentation/GraphCuts/Exact%20Maximum%20A%20Posteriori%20Estimation%20for%20Binary%20Images.pdf>>, J.R. Statist. Soc. B (1989) 51, No. 2, pp. 271-279.

Ishikawa, "Exact optimization for Markov ramdon fields with convex priors", retrieved on May 14, 2009 at <<http://www.nsc.nagoya-cu.ac.jp/~hi/MRF.pdf>>, IEEE Transactions on Patter Analysis and Machine Intelligence, vol. 25, No. 10, 17 pages, Oct. 2003.

Kohli, et al., "Efficiently Solving Dynamic Markov Random Fields using Graph Cuts", retrieved on May 14, 2009 at <<http://ieeexplore.ieee.org/xpl/freeabs_all.jsp?arnumber=1544820>>, Proceedings of the Tenth IEEE International Conference on Computer Vision (ICCV 2005), 8 pages.

Kohli, et al., "Measuring Uncertainty in Graph Cut Solutions—Efficiently Computing Min-marginal Energies using Dynamic Graph Cuts", retrieved on May 14, 2009 at <<http://research.microsoft.com/en-us/um/people/pkohli/papers%5Ceccv06a.pdf>>, Department of Computing, Oxford Brookes University, Oxford, 14 pages.

Kolmogorov, "Convergent Tree-Reweighted Message Passing for Energy Minimization", retrieved on May 14, 2009 at <<http://ieeexplore.ieee.org/xpl/freeabs_all.jsp?arnumber=1677515>>, IEEE Transactions on Pattern analysis and Machine Intelligence, vol. 28, No. 10, Oct. 2006, pp. 1568-1583.

Kolmogorov, et al., "Minimizing non-submodular functions with graph cuts—a review", retrieved on May 14, 2009 at <<http://www.cs.ucl.ac.uk/staff/V.Kolmogorov/papers/KR-PAMI07.pdf>>, University College London, pp. 1-15.

Komodakis, et al., "Fast Approximately Optimal Solutions for Single and Dynamic MRFs", retrieved on May 14, 2009 at <<http://ieeexplore.ieee.org/xpl/freeabs_all.jsp?arnumber=4270120>>, IEEE 2007, 8 pages.

Kopf, et al., "Capturing and Viewing Gigapixel Images", retrieved on May 14, 2009 at <<http://johanneskopf.de/publications/gigapixel/paper/FinalPaper_0371_light.pdf>>, 10 pages.

Kopf, et al., "Joint Bilateral Upsampling", retrieved on May 14, 2009 at <<http://research.microsoft.com/pubs/78272/JointBilateralUpsampling.pdf>>, 5 pages.

Lempitsky, et al., "Global Optimization for Shape Fitting", retrieved on May 14, 2009 at <<http://www.csd.uwo.ca/~yuri/Papers/cvpr07.pdf>>, In IEEE conference on Computer Vision and Pattern Recognition (CVPR), Minneapolis, Jun. 2007, 8 pages.

Lombaert, et al., "A Multilevel Banded Graph Cuts Method for Fast Image Segmentation", retrieved on May 14, 2009 at <<http://ieeexplore.ieee.org/xpl/freeabs_all.jsp?arnumber=1541265>>, Proceedings of the "Tenth IEEE International Conference on Computer Vision", ICCV 2005, vol. 1, pp. 259-265.

Moore, et al., "Superpixel Lattices", retrieved on May 14, 2009 at <<http://ieeexplore.ieee.org/xpl/freeabs_all.jsp?arnumber=4587471>>, IEEE 2008, pp. 1-8.

Perez, et al., "Restriction of a Markov Random Field on a Graph and Multiresolution Statistical Image Modeling", retrieved on May 14, 2009 at <<http://ieeexplore.ieee.org/xpl/freeabs_all.jsp?arnumber=481788>>, IEEE Transactions on Information Theory, vol. 42, No. 1, Jan. 1996, pp. 180-189.

Rhemann, et al., "High Resolution Matting via Interative Trimap Segmentation", retrieved on May 14, 2009 at <<http://ieeexplore.ieee.org/xpl/freeabs_all.jsp?arnumber=4587441>>, IEEE 2008, pp. 1-8.

Rother, et al., "'GrabCut'—Interactive Foreground Extraction using Iterated Graph Cuts", retrieved on May 14, 2009 at <<http://www.cs.ucl.ac.uk/staff/V.Kolmogorov/papers/grabcut_siggraph04.pdf>>, Microsoft Research Cambridge, UK, 6 pages.

Schlesinger, et al., "Transforming an Arbitrary Minsum Problem into a Binary One", retrieved on May 14, 2009 at <<http://www.bv.inf.tu-dresden.de/~ds24/tr_kto2.pdf>>, pp. 1-16.

Sinha, et al., "Multi-View Stereo via Graph Cuts on the Dual of an Adaptive Tetrahedral Mesh", retrieved on May 20, 2009 at <<http://ieeexplore.ieee.org/xpl/freeabs_all.jsp?arnumber=4408997>>, IEEE 2007, 8 pages.

Sinop, et al., "Accurate Banded Graph Cut Segmentation of Thin Structures Using Laplacian Pyraminds", retrieved on May 14, 2009 at <<http://www.cns.bu.edu/~lgrady/sinop2006accurate.pdf>>, Department of Imaging and Visualization, Siemens Corporate Research, Princeton, NJ, 10 pages.

Turek, et al., "Multiscale Modeling and Constraints for Max-flow/Min-cut Problems in Computer Vision", retrieved on May 14, 2009 at <<http://www.cs.rpi.edu/~freedd/publications/freedman_06_pocv.pdf>>, Rensselaer Polytechnic Institute, 8 pages.

Vogiatzis, et al., "Multi-view Stereo via Volumetric Graph-cuts", retrieved on May 14, 2009 at <<http://www.george-vogiatzis.org//publications/cvpr2005.pdf>>.

Weinman, et al., "Efficiently Learning Random Fields for Stereo Vision with Sparse Messge Passing", retrieved on May 14, 2009 at <<http://www.cs.rochesteredu/~cpal/eccv08/SMPstereo_final.pdf>>, 14 pages.

Weiss, et al., "On the Optimality of Solutions of the Max-Product Belief-Propagation Algorithm in Arbitrary Graphs", retrieved on May 14, 2009 at <<http://ieeexplore.ieee.org/xpl/freeabs_all.jsp?arnumber=910585>>, IEEE Transactions on Information Theory, vol. 47, No. 2, Feb. 2001, pp. 736-744.

U.S. Appl. No. 61/204,787, filed Jan. 19, 2009; Inventor Meridian Mark Shaw; 186 pages.

* cited by examiner

IMAGE LABELING USING MULTI-SCALE PROCESSING

BACKGROUND

Image labeling systems are used in many image processing application domains such as 3D reconstruction, stereo, object segmentation and optical flow. Image elements such as pixels, groups of pixels, voxels or groups of voxels are labeled by the system as belonging to one of a plurality of specified types. For example, in the case of object segmentation an image element may be labeled as either a foreground or a background image element. This is useful in digital photography, medical image analysis, and other application domains where it is required to find a boundary between a main object in the image and a background. The main object and the background may then be processed separately. In the case of a medical image it may be required to segment out a region of an image depicting a tumor or organ such as the lungs in order to enable a surgeon to interpret the image data.

Existing energy optimization algorithms for image labeling are computationally intensive and time consuming. Such techniques are used for low resolution images and/or where the application domain allows long processing times. However, in recent years advances in image acquisition technologies have significantly increased the size of images and 3D volumes. For instance, the latest commercially available cameras can capture images with almost 20 million pixels. In fact it is now possible to capture giga-pixel images of complete cities. Similarly, medical imaging systems can acquire 3D volumes with billions of voxels. This type of data gives rise to large scale optimization problems to find a labeling which are extremely computationally expensive to solve and require large amounts of memory.

Multi-scale processing is one type of approach that has been used to reduce the memory and computational requirements of optimization algorithms for image labeling. In order to label a large image (or 3D volume) they first solve the problem at a low resolution, obtaining a coarse labeling of the original high resolution problem. This labeling is refined by solving another optimization on a small subset of the pixels. However, such multi-scale approaches are best suited to "blob-like" segmentation targets and tend to fail to segment thin structures. This means that the multi-scale approach is often not suitable for analyzing medical images for example, where fine detail structures may be extremely important when making a medical diagnosis. Also, for other applications such as digital image editing and object recognition thin structures need to be successfully segmented.

There is a need to provide an improved image labeling system which has reduced computational requirements, improved speed and yet gives high quality results.

The embodiments described herein are not limited to implementations which solve any or all of the disadvantages of known multi-scale image labeling systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Image labeling using multi-scale processing is described. Multi-scale processing may be used to reduce the memory and computational requirements of optimization algorithms for image labeling, for example, for object segmentation, 3D reconstruction, stereo correspondence, optical flow and other applications. For example, in order to label a large image (or 3D volume) a multi-scale process first solves the problem at a low resolution, obtaining a coarse labeling of an original high resolution problem. This labeling is refined by solving another optimization on a subset of the image elements. In examples, an energy function for a coarse level version of an input image is formed directly from an energy function of the input image. In examples, the subset of image elements may be selected using a measure of confidence in the labeling.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image labeling system for foreground/background image segmentation, the system described is provided as an example and not a limitation. As those skilled in the art will appreciate, the present examples are suitable for application in a variety of different types of image labeling systems and a non-exhaustive list of examples is: 3D reconstruction, stereo matching, object segmentation, object recognition and optical flow.

Figure 1:
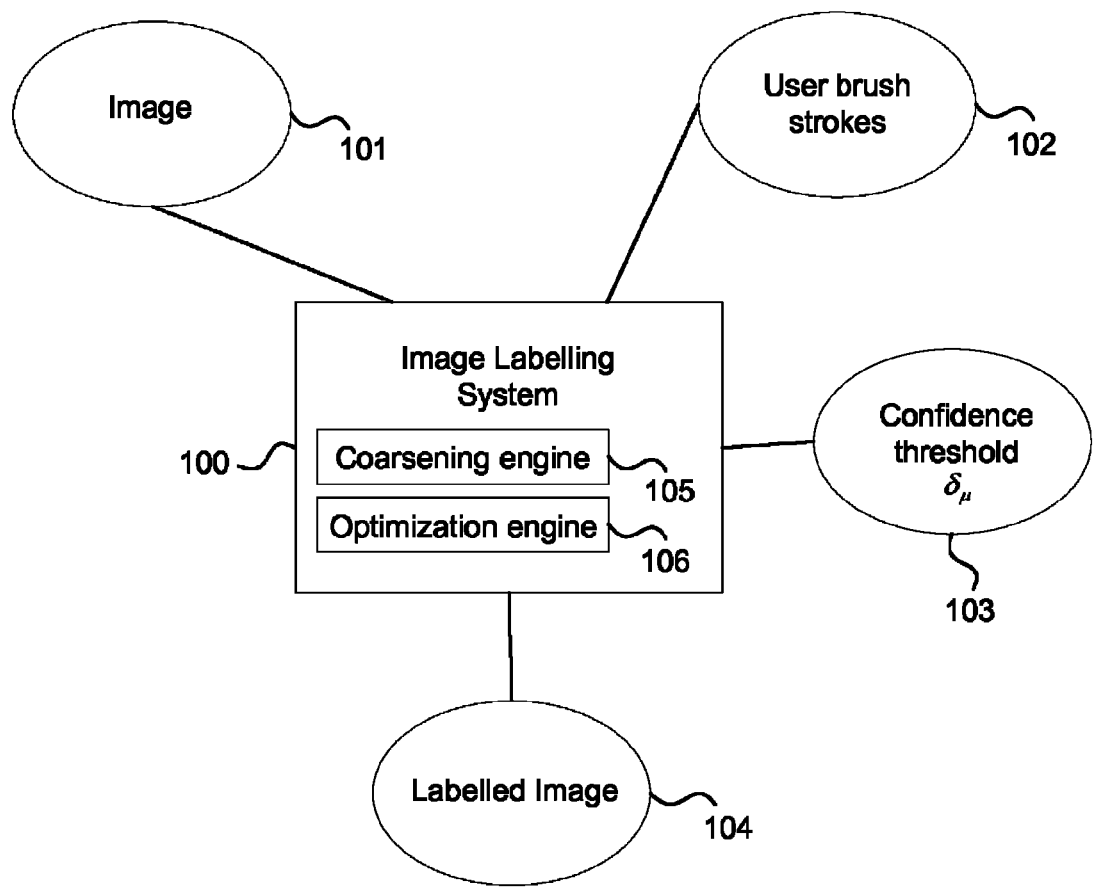
FIG. 1 is a schematic diagram of an image labeling system.

FIG. 1 is a schematic diagram of an image labeling system 100 implemented using a computer or processor of any suitable type. It is arranged to receive an image 101 as input and to provide as output a labeled version of that image 104 comprising, for each image element, one of a specified plurality of possible labels. An image element may be a pixel, a group of pixels, a voxel or a group of voxels. The term "image" is used herein in a broad sense to include digital still images such as photographs, video stills, or other digital 2D images, medical images such as CT scans, MRI scans or other digital medical images, digital 3D images or higher dimensional images such as obtained from Z-cameras, voxel volumes, satellite imaging systems, ultra-sound scans, as well as sequences of images such as videos, or other captured or generated sequences of images. The image labeling system optionally receives user input 102 specifying "seeds" for the labeling in the case that the image labeling uses an interactive segmentation algorithm. The image labeling system also optionally receives a user specified confidence threshold 103 in order to control a trade-off between the quality of the segmentation and the computation time. However, this parameter value may be automatically configured by the image labeling system itself.

The image labeling system 100 may comprise a coarsening engine 105 arranged to form an image pyramid from input images as described in more detail below. The image labeling system 100 may also comprise an optimization engine 106 for optimizing energy functions as described in more detail below.

Figure 2:
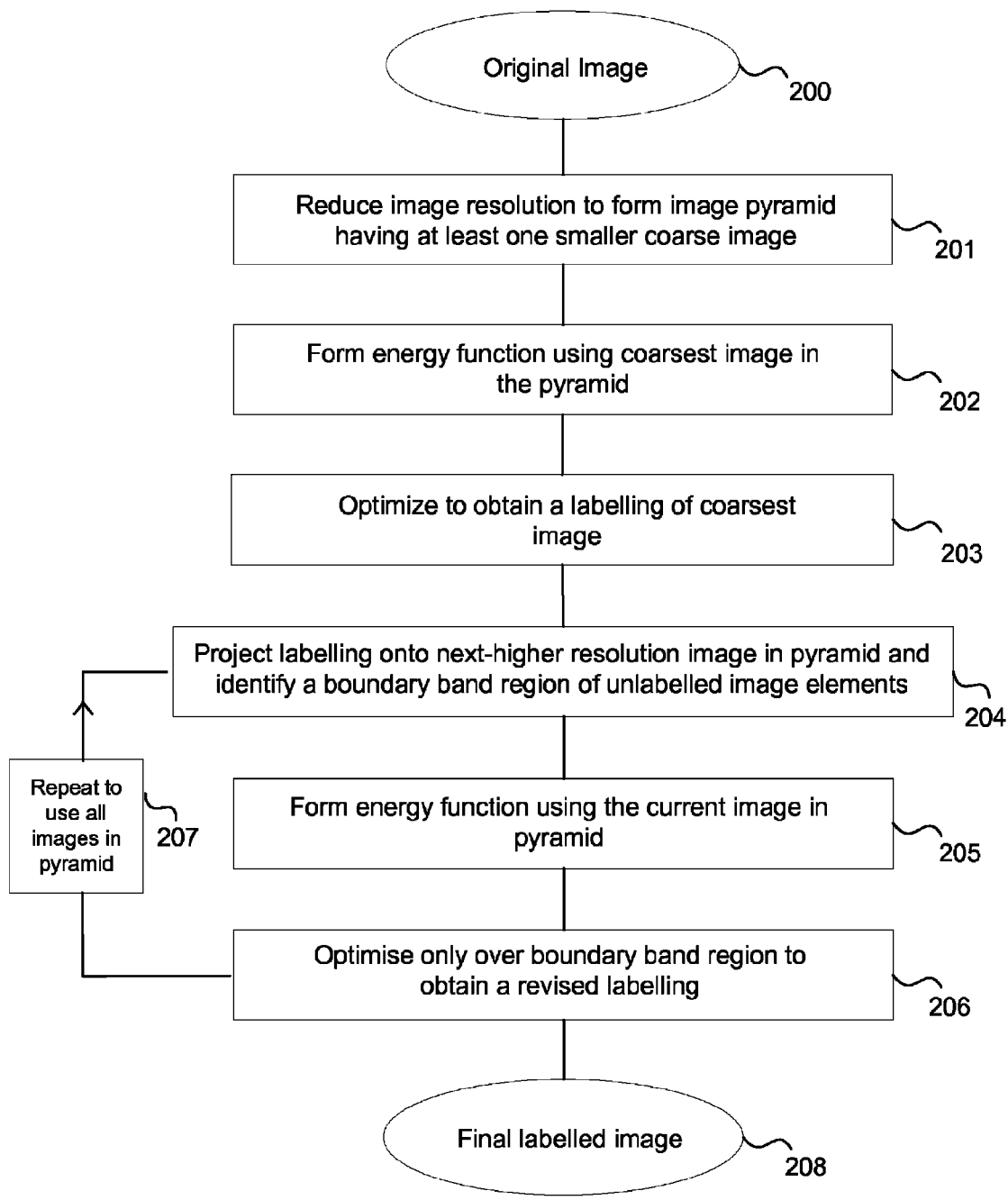
FIG. 2 is a flow diagram of an example multi-scale method of image labeling.

FIG. 2 is a flow diagram of a multi-scale image labeling method. This method (and the other methods described herein) is described with reference to segmenting a foreground region from a background region in a digital image. However, it may be applied to other types of image labeling problem. An original image 200 is received and used to form an image pyramid. This is done by repeatedly reducing 201 the image resolution to form a series of images each smaller and coarser than the previous image in the sequence and thus forming a "pyramid" structure with the smallest, lowest resolution image at the apex and the original image at the base. The pyramid has at least two images, the original image and at least one lower resolution version of the original image. An energy function is formed 202 using the coarsest image in the pyramid and that energy function is optimized to obtain 203 a labeling of the coarsest image. The coarse labeling is projected onto the next-higher resolution image in the pyramid and a boundary band region is identified 204. The boundary band region contains unlabeled image elements and it surrounds the boundary between the foreground and background. Another energy function is formed using the current image in the pyramid 205 and that energy function is optimized 206 only over the boundary band region to obtain a revised labeling. The steps 204, 205, 206 are repeated to use 207 all the images in the pyramid and a final labeled image is produced 207 of the same resolution as the original image.

As mentioned in the background section above, multi-scale approaches have previously been used to reduce the computation requirement of image labeling optimization problems. However, when presented with a segmentation target which is blob-like but has some fine detail structures previous multi-scale methods give a result that loses the fine detail structures. For example, when segmenting an image of a doll standing with two thin legs the doll's body may be obtained but the legs omitted.

It is recognized herein for the first time that previous multi-scale approaches have lost fine detail thin structures because the energy functions used have been formed directly from the coarse, low resolution images. Indeed, the rationale of those approaches was to reduce computational requirements by doing so. Fine detail is lost in the coarsening operation used to produce the image pyramid. To alleviate this, it has been suggested to form a Laplacian image pyramid (in addition to the image pyramid) to preserve the fine detail information. However, it is recognized herein that such an approach still involves forming the energy functions to be minimized from the coarse-scale images and that by doing this, fine detail information is lost. An additional structure, the Laplacian pyramid must then be created and manipulated in order to work around or reduce the effects of this problem. Previous multi-scale approaches have often been unable to recover from large errors present in the coarse labeling. For instance, if a thin foreground structure is missed in the coarse labeling, a large band of pixels will need to be analyzed at the fine scale. This would make the size of the resulting higher resolution problem large and reduce the computational benefits.

Figure 3:
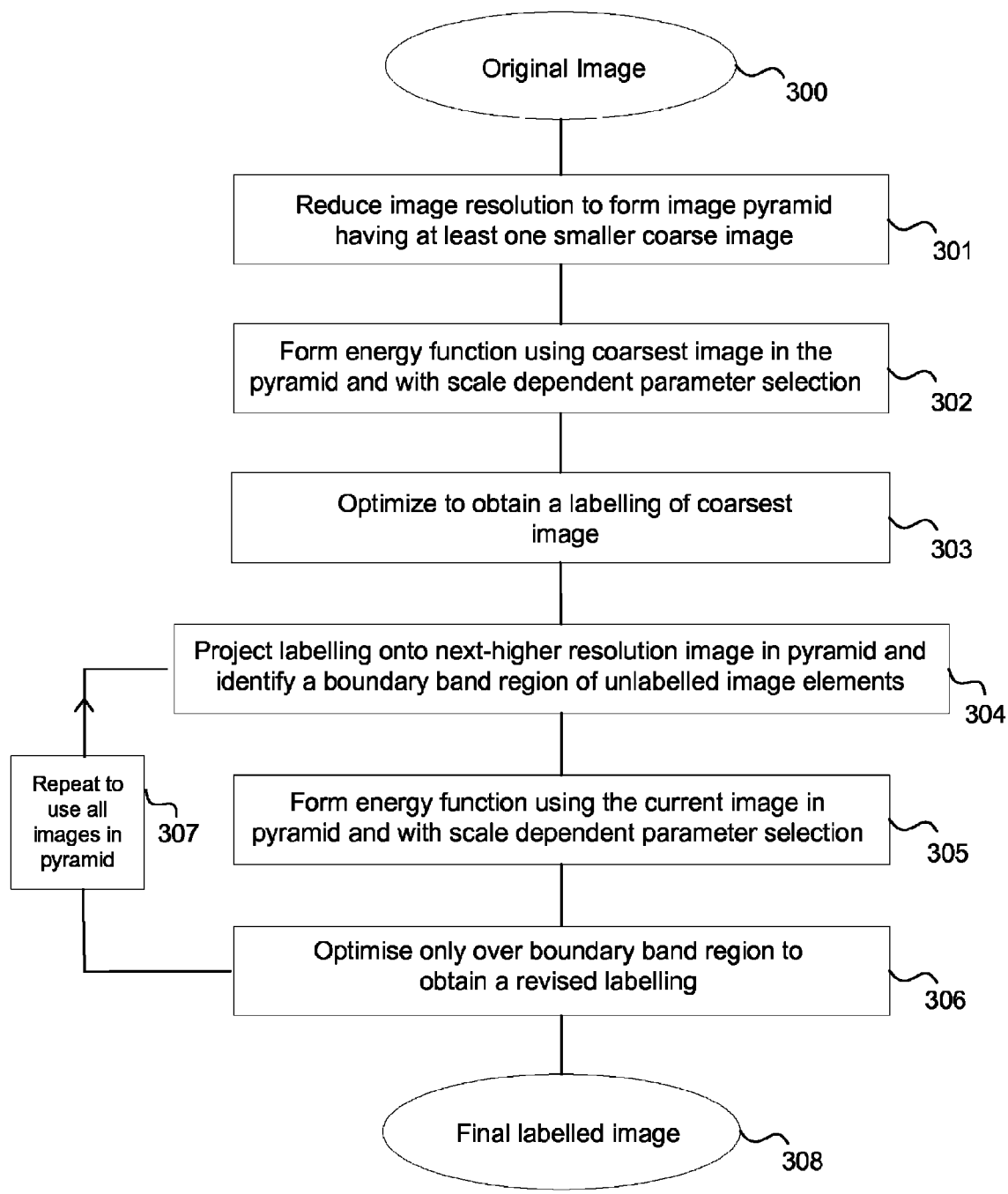
FIG. 3 is a flow diagram of an example multi-scale method of image labeling using scale dependent parameter selection.

In some embodiments of the present invention the method of FIG. 2 may be used with the process at steps 202 and 205 of forming the energy functions modified to involve scale-dependent parameter selection. This is illustrated in FIG. 3 which shows steps 302 and 305 of forming an energy function using the coarse-level image but with scale-dependent parameter selection.

Figure 4:
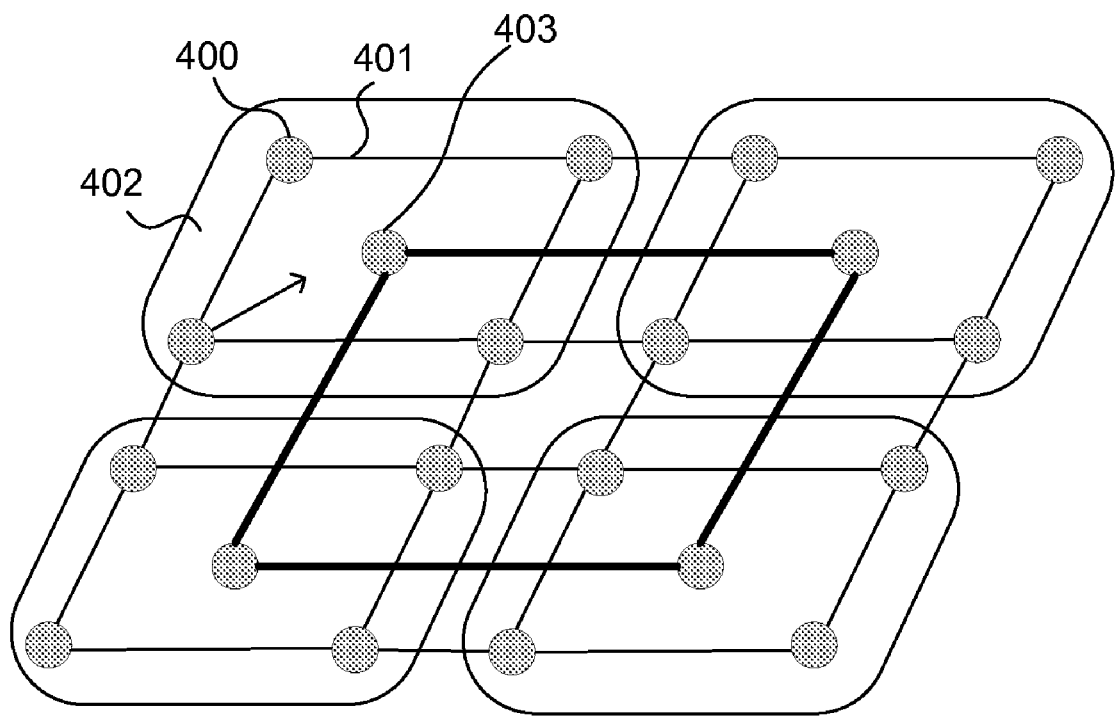
FIG. 4 is a schematic diagram of a mapping between a high resolution image and a lower resolution image.

An image is received 300 at high resolution and is used to form 301 an image pyramid. For example, a square grid of image elements in the high resolution image is mapped to a single image element in a low resolution image and this process is repeated over the high resolution image to generate the low resolution image. The mapping may comprise taking the average of the intensities of the image elements in the square grid and assigning the average to the single image element in the low resolution image. However, it is not essential to use this averaging process; any suitable coarsening function may be used. FIG. 4 is a schematic diagram of part of a grid representing the high resolution image and illustrating a mapping to a grid representing part of a low resolution image. The grid representing the high resolution image is formed from the unshaded nodes 400 connected by edges 401. Each square grid of nodes 402 in the high resolution grid maps to a single node 403 in the low resolution grid. A single node 403 in the reduced grid is referred to as a parent of four child nodes 402 in the original grid. It is not essential to use a square patch mapping as illustrated in FIG. 4. Any many-to-one mapping between the fine to coarse grids may be used although the embodiments described herein use a square patch mapping for ease of description.

Step 302 of forming an energy function is now explained. The particular labeling problem is described using a Markov Random field (MRF) or conditional random field (CRF) model depending on the particular application. For example, in the case that foreground/background image segmentation is required a CRF may be used. A summary of how MRFs and CRFs may be used to describe an image labeling problem is now given. Consider a discrete random field X defined over a lattice $V=\{1,2,\ldots,n\}$ with a neighbourhood system E. Each random variable $X_i \in X$ is associated with a lattice point $i \in V$ and takes a value from the label set $L=\{l_1,l_2,\ldots,l_k\}$. The neighborhood system E of the random field is a set of edges (i,j) which connect some random variables. Any possible assignment of labels to the random variables will be called a labeling (denoted by x) which takes values from the set $L=L^n$. The most probable or maximum a posterior (MAP) labeling x* of the random field can be computed by maximizing the posterior or alternatively minimizing the energy of the random field as:

$$x^{opt} = \underset{x \in L}{\arg\max} \Pr(x \mid D) = \underset{x \in L}{\arg\min} E(x)$$

Once a particular MRF or CRF model has been selected an energy function for that model is specified. The random field models used in the embodiments are pairwise CRFs. However, it is not essential to use pairwise CRFs; other types of random field models may be used depending on the labeling problem concerned i.e. their energy function E: $L^n \to R$ can be written as a sum of unary and pairwise functions as:

$$E(x) = \sum_{i \in V} \varphi_i(x_i) + \sum_{(i,j) \in \varepsilon} \varphi_{ij}(x_i, x_j).$$

For image segmentation, the set V corresponds to the set of all image pixels, $\varepsilon$ is set of all edges between pixels in a 4 or 8 neighbourhood (or other size neighbourhood). The random variable $X_i$ denotes the labeling of pixel i of the image. The label set L consists of two labels: foreground (fg) and background (bg). Every possible assignment of the random variables x (or configuration of the CRF) defines a segmentation.

The unary potential $\phi_i$ of the CRF is defined as the negative log of the likelihood of a label being assigned to pixel i. It can be computed from the colour of the pixel and appearance models for the foreground and background segments. The appearance models may be constructed in any suitable manner. For example, from user defined brush strokes 102 as described in Blake et al. "Interactive segmentation using an adaptive GMMRF model" in ECCV, pages I: 428-441, 2004 which is incorporated herein by reference in its entirety. Formally, $$\phi(x_i=S)=-\log Pr(I_i|x_i=S)$$

where $S \in \{fg, bg\}$. The pairwise terms $\phi_{ij}$ of the CRF take the form of a contrast sensitive Ising model:

$$\varphi(x_i, x_j) = \begin{cases} 0 & \text{if } x_i = x_j \\ g(i, j) & \text{otherwise,} \end{cases}$$

where the function g(i,j) is an edge feature based on the difference in colors of neighboring pixels. It may be defined as:

$$g(i,j)=\theta_p+\theta_v\exp(-\theta_\beta\|I_i-I_j\|^2),$$

where $I_i$ and $I_j$ are the colour vectors of pixel i and j respectively.

In the methods of FIG. 3 the energy function formed at step 302 may be represented as $E^l$ defined over the coarse grid $V^l$. The energy $E^l$ defined over $V^l$ has the same form as the original energy E. Formally, it can be written as:

$$E^l(x^l) = \sum_{i \in V^l} \phi_i^l(x_i^l) + \sum_{(i,j) \in \varepsilon^l} \phi_{ij}^l(x_i^l, x_j^l)$$

The unary and pairwise potentials for this energy function in the method of FIG. 3 are defined using the low resolution version of the image. For example the energy potentials are defined using a low-resolution version $I^l$ of the original I image. Formally, the potential functions are defined as: $\phi^l(x_i^l=S)=-\log \Pr(I_i^l|x_i^l=S)$, where $S \in \{fg, bg\}$. The pairwise potential is defined as:

$$\phi_{ij}(x_i^l, x_j^l) = \begin{cases} 0 & \text{if } x_i^l = x_j^l, \\ g^l(i, j) & \text{otherwise} \end{cases}$$

Here the function $g^l(\cdot)$ is defined as:

$$g^l(i,j)=\theta_p^l+\theta_v^l\exp(-\theta_\beta^l\|I_i^l-I_j^l\|^2),$$

where $I_i^l$ and $I_j^l$ are the colour vectors of pixels of the low resolution image $I^l$ which correspond to variables $X_i^l$ and $X_i^l$ respectively.

In the embodiments described with reference to FIG. 3 the parameters of the pairwise potentials of the coarse level energy function are obtained by taking those parameters from the original energy function (that of the original image) and scaling those using a scaling parameter. This scaling parameter is related to the mapping used to produce the coarse level image. For example, in the case illustrated in FIG. 4 the scaling parameter is related to 0.25 since the four by four grid is mapped to a two by two grid. The parameters of the pairwise potentials control the strength of those potentials which in turn penalize segmentation boundaries. The length of the segmentation boundary in image element terms is reduced when moving from the original image to the low-resolution image. Therefore in the embodiments of FIG. 3 the potential parameters are scaled. For example, the following scaling may be used:

$$\{\theta_p^l, \theta_v^l, \theta_\beta^l\}=\{\sqrt{\omega_s}\theta_p, \sqrt{\omega_s}\theta_v, \theta_\beta\}.$$

However, any suitable scaling may be used depending on the type of mapping between the original and low-resolution versions of the image.

The energy function is optimized 303 to obtain a labeling of the coarsest image. Any suitable optimization engine may be used for this. For example, in the case that the random field model is pairwise and the energy function is a sum of unary and pairwise functions, then optimization engines implementing message passing algorithms or combinatorial algorithms may be used. Examples of message passing algorithms such as belief propagation and its tree reweighted versions are described in the following references which are incorporated herein by reference in their entirety: V. Kolmogorov "Convergent tree-reweighted message passing for energy minimization" IEEE Trans. Pattern Anal. Mach. Intell., 28(10):1568-1583, 2006; Weiss and Freeman "On the optimality of solutions of the max-product belief-propagation algorithm in arbitrary graphs" Transactions on Information Theory, 2001. Examples of combinatorial algorithms such as graph cuts are described in detail in the following references which are incorporated herein by reference in their entirety. Boykov et al. "Fast approximate energy minimization via graph cuts" PAMI, 2001; Komodakis et al. "Fast, approximately optimal solutions for single and dynamic MRFs". In CVPR, 2007.

The labeling obtained from the coarsest image is projected 304 onto the next-higher resolution image in the pyramid and a boundary band region is identified in that next-higher resolution image. The boundary band region surrounds the boundary between the foreground and background and is filled with unlabeled image elements. An example of a method of forming such a boundary band region is now described. Use the lowest cost solution $x^{l^*}$ of the coarse energy $E^l$ for defining the partial labeling. For instance, first define a full labeling of the original variables $x^e$ as: $x_i^e = x_{k(i)}^{l*}$, where recall k(i) returns the parent of any variable $X_i, i \in V$.

From the solution $x_e$, compute a boundary distance function D:V→R which returns the distance of a pixel i from the boundary between the different label segments (fg and bg) in the labeling $x_e$. The set of variables assigned the label $\epsilon$ (i.e. unlabeled) is computed by finding the set of nodes $P_B(\delta)$ which are at most a particular distance $\delta$ away from the boundary i.e. $x_i^e = \epsilon, \forall i \in V, D(i) \leq \delta$. Formally, the set is defined as $P_B(\delta) = \{i: i \in V, D(i) \leq \delta\}$.

An energy function is then formed 305 using the current image in the pyramid and using scale dependent parameter selection as described above. That energy function is optimized 306 only over the boundary band region to obtain a revised labeling. The steps 304, 305, 306 are repeated 307 to use all the images in the pyramid until a final labeled image 307 is output and stored and/or rendered on a display.

Figure 5:
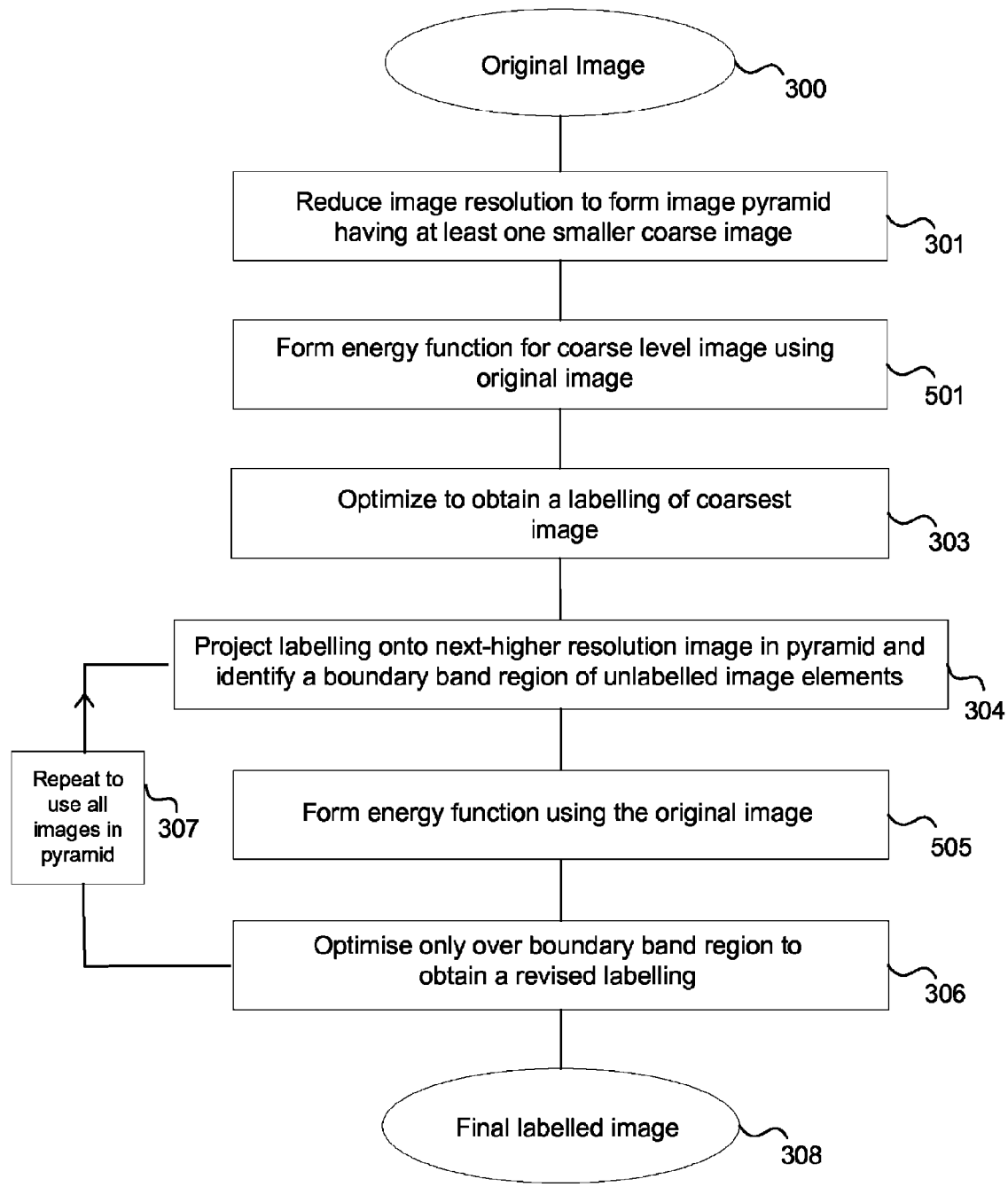
FIG. 5 is a flow diagram of multi-scale method of image labeling where an energy function is formed for a coarse level image using an original higher resolution image.

FIG. 5 is a flow diagram of multi-scale method of image labeling where an energy function is formed for a coarse level image using an original higher resolution image. As mentioned above, it is recognized herein for the first time that previous multi-scale approaches have lost fine detail thin structures because the energy functions used have been formed directly from the coarse, low resolution images. In some embodiments of the present invention, the energy functions are formed directly from the energy function of the original high-resolution image as illustrated at steps 501 and 505 in FIG. 5. The other steps of the method of FIG. 5 may be the same as the corresponding steps in FIG. 3 and like reference numerals are used to indicate this. The potentials for the course grid energy $E^l$ may be specified directly from the potentials of the original energy E. An example method to compute the unary potential for a variable $X_i^l$ is to sum the unary potentials of all the variables in its child set V(i). Formally, $\phi_i^l(x_i^l = S) = \Sigma j \in v(i) \phi(x_j = S)$. Similarly, the pairwise potential for an edge $(u,v) \in \epsilon^l$ may be computed by summing the pairwise potentials defined between their children. Formally, $$\phi_{ij}^l(x_i^l, x_j^l) = \begin{cases} 0 & \text{if } x_i^l = x_j^l, \\ g_e^l(i, j) & \text{otherwise} \end{cases}$$

Here the function $g_e^l(\cdot)$ is defined as:

$$g_e^l(i, j) = \sum_{\substack{(u,v) \in \varepsilon: u \in V(i) \\ v \in V(j)}} \phi_p + \phi_v \exp(-\phi_\beta \|I_u - I_v\|^2)$$

Any method of combining the unary potentials of the variables in the child set may be used and any method of combining the pairwise potentials defined between the children may be used.

Figure 6:
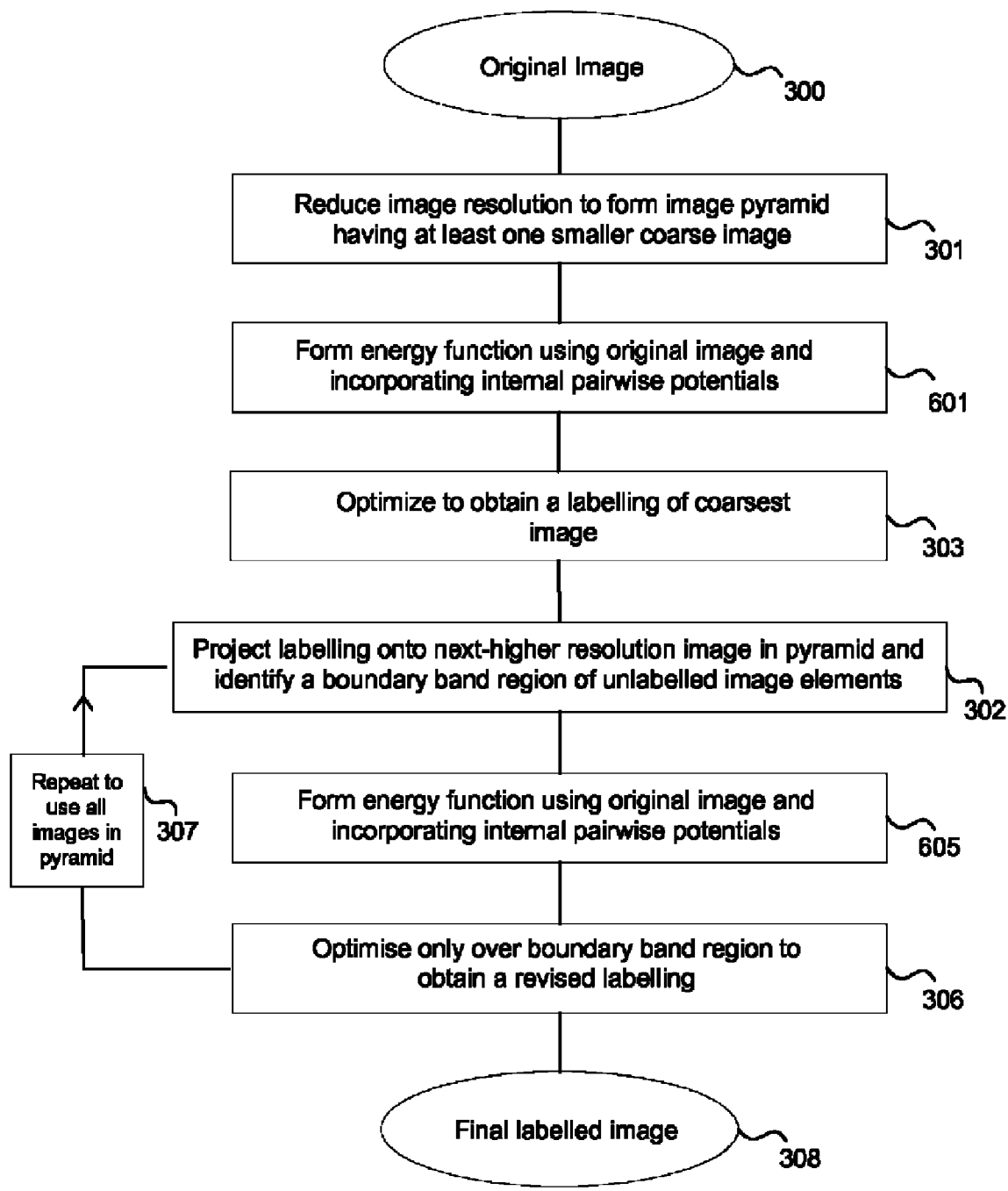
FIG. 6 is a flow diagram of the method of FIG. 5 which incorporates internal pairwise potentials in the energy function.

FIG. 6 is a flow diagram of the method of FIG. 5 which incorporates internal pairwise potentials in the energy function. That is, in some embodiments the method of FIG. 5 at steps 601, 605 is arranged to incorporate internal pairwise potentials when forming the energy function. In these embodiments pairwise potentials defined on variables which have the same parent are taken into account. For example, this is achieved by computing a lower bound on flow that can be passed between child nodes constituting any two sides of the child-set square of a coarse variable. This bound is used as the upper bound on the capacity of the edges which connect a particular parent node to other parent nodes. The bound may be estimated by finding the minimum capacity edge in the child set.

For example, the pairwise potential has the same form as in the original energy but now define function $$g_e^l(i, j) = R(i, j) \min_{\substack{k \in [i, j], (u,v) \in \varepsilon \\ u \in V(k), v \in V}} \phi_p + \phi_v \exp(-\phi_\beta \|I_u - I_v\|^2).$$

where R(i,j)) is the number of edges between child-sets of the two coarse level variables $X_i$ and $X_j (i,j \in V^l)$. Formally, $$R(i, j) = \sum_{(u,v) \in \varepsilon: u \in V(i), v \in V(j)} 1.$$

Figure 7:
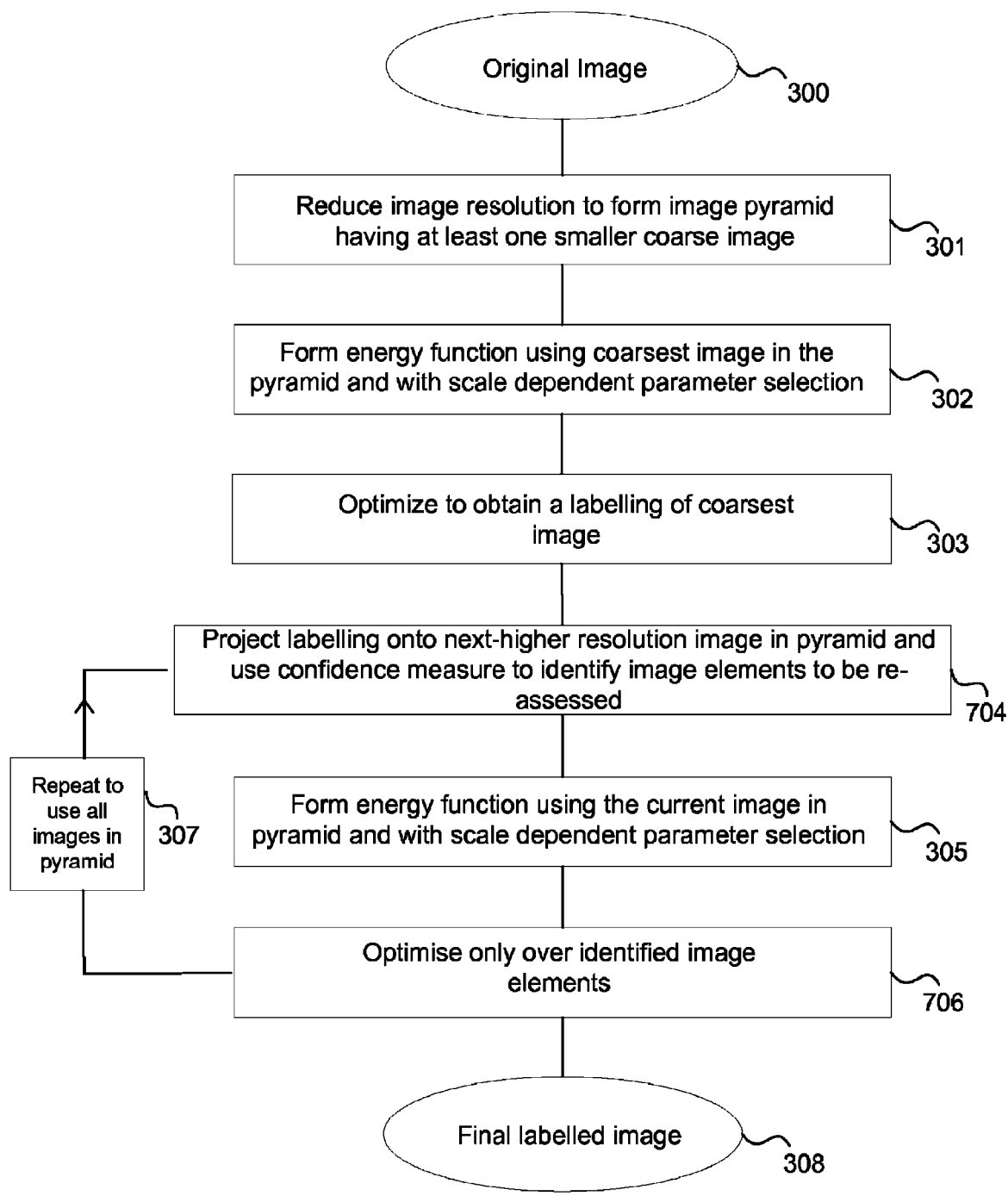
FIG. 7 is a flow diagram of a multi-scale image labeling method which uses a confidence measure to identify image elements to be reassessed.

FIG. 7 is a flow diagram of a multi-scale image labeling method which uses a confidence measure to identify image elements to be reassessed. It is recognized herein that the band-based approach for extracting partial labelings described above with reference to FIG. 3 does not take into account the confidence or uncertainty associated with the label assignments. In some embodiments partial solutions are computed using a label assignment confidence measure to identify those image elements to be reassessed at the next level. This is illustrated in FIG. 7 in which step 705 involves using a confidence measure to identify image elements to be reassessed. The other steps of the method may be as in FIG. 3 or any of FIGS. 5 and 6. Any suitable confidence measure may be used. For example, the confidence measure may comprise min-marginals as described in more detail below. In another example, the confidence measure may be based on color information of the unary potentials used to give an indication of how likely the variable is to be part of the foreground or background. Any other measure of the confidence of the label assignments may be used.

More detail about min-marginals is now given. Given an energy function, the min-marginal encodes the confidence associated with a variable being assigned the MAP label. More concretely, the min-marginal $\psi_{i;a}$ returns the energy value obtained by fixing the value of variable $X_i$ to label $a(x_i = a)$ and minimizing over all remaining variables. Formally, $\psi_{i;a} = \min_{X, x_i = a} E(X)$. Any suitable method for computing the min-marginals may be used. Once the min-marginals are available these are used to provide a confidence score in any suitable manner. For example, the absolute difference between the min-marginals corresponding to the foreground and background labels is used as a confidence score function $\mu: V \to R$. Formally, $\mu(i) = \|\psi_{i;fg} - \psi_{i;bg}\|$. If the difference between min-marginals of any variable $X_i$ corresponding to taking the MAP label and any other label is large, then the variable is assigned a high confidence score. The set of variables assigned the label $\epsilon$ in the partial solution is now computed by finding the set of nodes $P_M(\delta)$ whose confidence scores are less than some constant $\delta_\mu$ i.e. $x_i^e = \epsilon, \forall i \in V, \mu(i) \leq \delta_\mu$. Formally, the set is defined as $P_M(\delta_\mu) = \{i: i \in V, \mu(i) \leq \delta_\mu\}$. Similar to the boundary band-width parameter $\delta_B$, the value of the confidence threshold $\delta_\mu$ can be used to the change the number of unlabeled variables.

Figure 8:
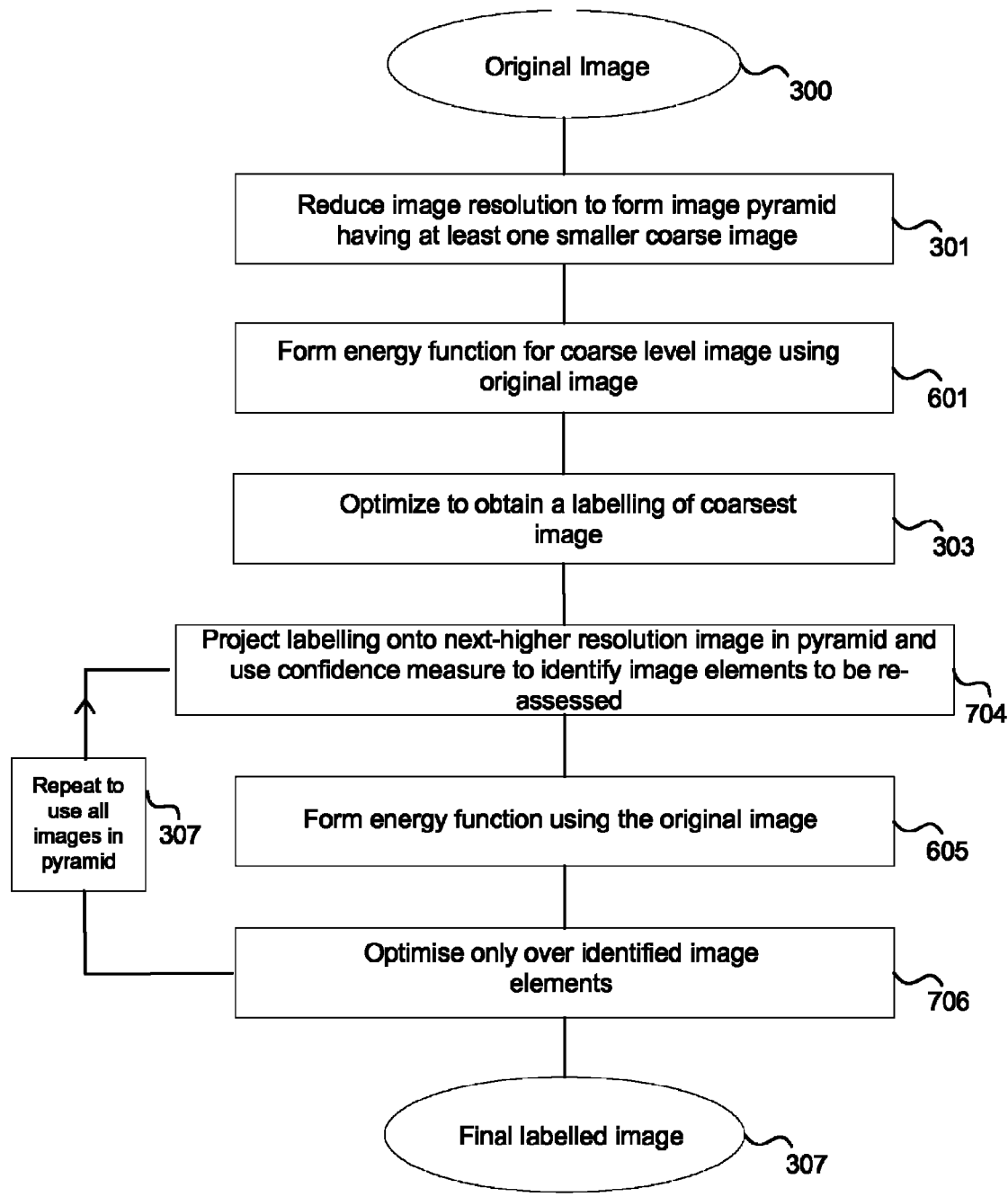
FIG. 8 is a flow diagram of a multi-scale image labeling method using steps from the methods of FIG. 6 and FIG. 7.

In some embodiments aspects of the methods of FIG. 6 and FIG. 7 are combined as illustrated in FIG. 8. In this case the energy function is formed using the original image at steps 601, 605 and a confidence measure is used to identify the image elements to be reassessed at step 704. By combining these aspects improved results are obtained.

Figure 9:
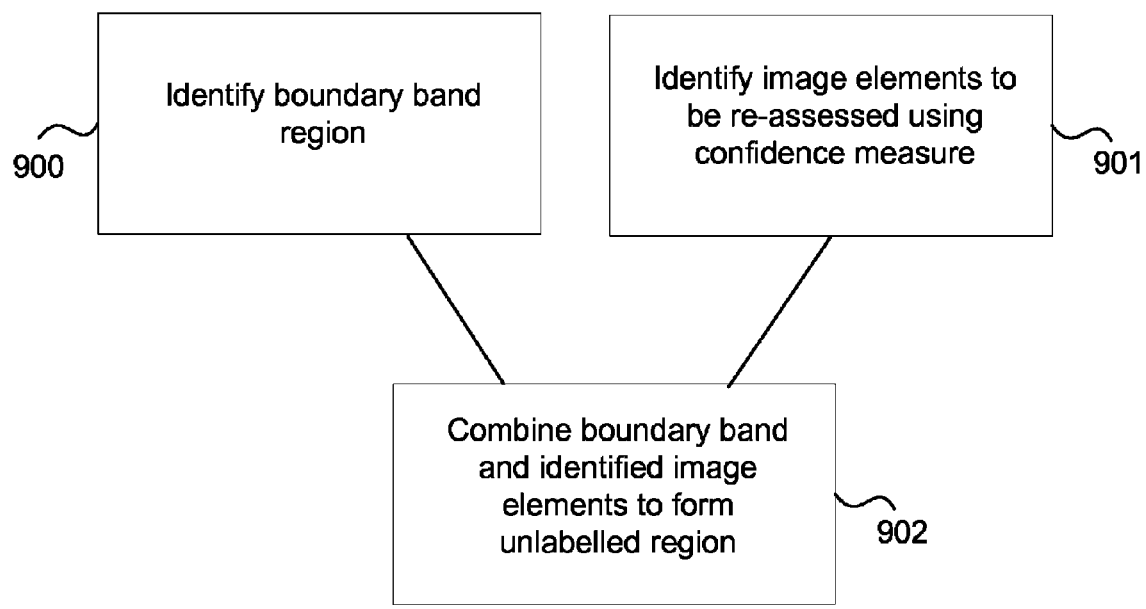
FIG. 9 is a flow diagram of part of a multi-scale image labeling method using a hybrid approach.

In some embodiments a hybrid of the boundary band selection approach of FIG. 3 and the confidence measure selection approach of FIG. 7 is used. FIG. 9 illustrates this for part of a multi-scale image labeling method which may be used as part of any of the methods described herein or other suitable multi-scale image labeling methods. This approach enables variables which are spatially distant from the main foreground segment to be removed or avoided in the resulting partial labeling. For example, construct the new function H: V→R which is defined as: $H(i)=\mu(i)D(i)$. As before, the set of variables assigned the label $\epsilon$ is now computed by finding the set of nodes $P_H(\delta)=\{i : i \in V, \mu(i) \leqq \delta_\mu\}$. Formally, the partial solution is defined as: $x_i^e = \epsilon, \forall i \in V, H(i) \leqq \delta_H$.

The hybrid approach results in a much smaller problem to be solved while still obtaining an accurate global minimum.

The quality of partial labelings generated from different coarse energy construction using the boundary band method were compared. It was found that the results using scale dependent parameters are better than for traditional approaches in which scale dependent parameters are not used. Also the method for constructing coarse energy directly from the original energy function outperforms other methods. It achieved a correctness of 99.5% with less than 10% of unlabelled variables.

The relative performance of different techniques for extracting the partial solution were compared. In order to give the exact labeling of the original image the percentage of unlabeled variables required for the boundary band, uncertainty and hybrid approaches was 35%, 17% and 9% respectively.

When high levels of accuracy are required the multi-scale methods described herein using confidence measures (e.g. FIG. 7) are able to find a globally optimal solution in a fraction of the time required by conventional energy minimization processes.

Figure 10:
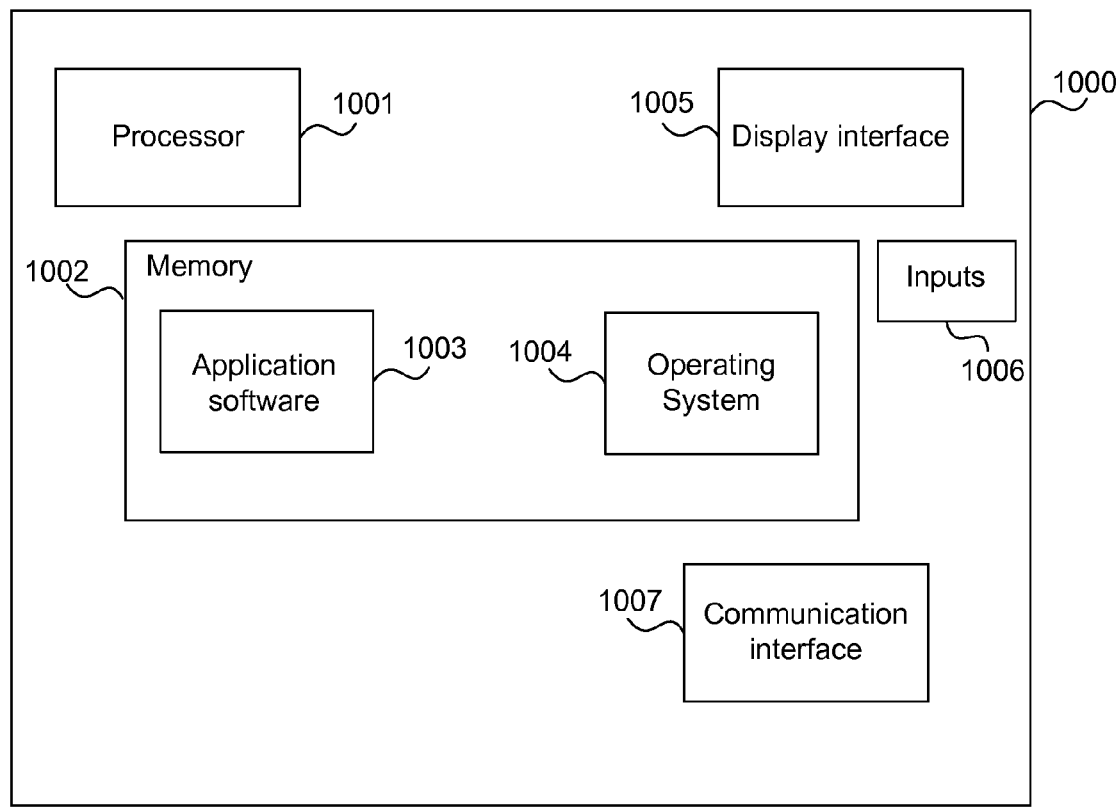
FIG. 10 illustrates an exemplary computing-based device in which embodiments of a clustering system may be implemented.

FIG. 10 illustrates various components of an exemplary computing-based device 1000 which may be implemented as any form of a computing and/or electronic device, and in which embodiments of an image labeling apparatus may be implemented.

The computing-based device 1000 comprises one or more inputs 1006 which are of any suitable type for receiving media content, Internet Protocol (IP) input, 2D or higher dimensional digital images including moving images such as videos, generated or captured moving images. The device also comprises communication interface 1007 to enable the device to connect to a communications network and communicate with other entities on the network.

Computing-based device 1000 also comprises one or more processors 1001 which may be microprocessors, controllers or any other suitable type of processors for processing computing executable instructions to control the operation of the device in order to label images. Platform software comprising an operating system 1004 or any other suitable platform software may be provided at the computing-based device to enable application software 1003 to be executed on the device.

The computer executable instructions may be provided using any computer-readable media, such as memory 1002. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 1005 may be provided to control a display system and may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. An image labeling apparatus comprising:
an input arranged to receive a first image to be labeled;
a coarsening engine arranged to repeatedly reduce the resolution of the original image according to a scaling factor to form an image pyramid;
a processor arranged to form an energy function using the coarsest image in the pyramid, the energy function comprising at least a pairwise function and wherein the processor is arranged to adjust parameter values of the pairwise function on the basis of the scaling factor;
an optimization engine arranged to optimize the energy function to obtain a labeling of the coarsest image;
the processor being arranged to project the labeling onto the next-coarsest image in the pyramid to obtain a region of unlabelled image elements;
the processor being arranged to form another energy function using the current image in the pyramid, the other energy function using the current image comprising at least another pairwise function, and wherein the processor is arranged to adjust parameter values of the other pairwise function on the basis of the scaling factor;
the optimization engine being further arranged to optimize the another energy function only over the region of unlabelled image elements to obtain a revised labeling; and
wherein the processor and optimization engine are further arranged to repeatedly: project the revised labeling, form another energy function and optimize that energy function; to use all the images in the pyramid and so produce a labeled version of the first image.

2. An apparatus as claimed in claim 1 wherein the processor is further arranged to obtain the region of unlabelled image elements by using a measure of the confidence of the labeling.

3. An apparatus as claimed in claim 2 wherein the processor is further arranged to calculate and use min-marginals as the measure of the confidence of the labeling, where the min-marginal of an image element is an energy value obtained by fixing the label of that image element to a specified label and optimizing the energy function over the remaining image elements.

4. An apparatus as claimed in claim 1 wherein the processor is further arranged to obtain the region of unlabelled image elements by finding a first region of unlabelled image elements using a measure of confidence of the labeling; finding a second region of unlabelled image elements using a distance from a segmentation boundary; and combining the first and second regions.

5. An image labeling apparatus comprising:
an input arranged to receive a first image to be labeled;
a coarsening engine arranged to repeatedly reduce the resolution of the original image to form an image pyramid;
a processor arranged to form an energy function for the coarsest image in the pyramid directly from an energy function of the original image;
an optimization engine arranged to optimize the energy function to obtain a labeling of the coarsest image;
the processor being further arranged to project the labeling onto the next-coarsest image in the pyramid to obtain a region of unlabelled image elements;
the processor being further arranged to form another energy function for the current image in the pyramid from the energy function of the original image;
the optimization engine being further arranged to optimize the another energy function only over the region of unlabelled image elements to obtain a revised labeling; and
wherein the processor and optimization engine are arranged to repeatedly: project the revised labeling, form another energy function and optimize that energy function; to use all the images in the pyramid and so produce a labeled version of the first image.

6. An apparatus as claimed in claim 5 wherein the processor is arranged to form an energy function for a particular image in the pyramid by obtaining a unary potential for each image element by combining unary potentials of a child set of image elements being those image elements in the original image which are mapped to the image element concerned by the coarsening engine.

7. An apparatus as claimed in claim 5 wherein the processor is arranged to form an energy function for a particular image in the pyramid by obtaining a pairwise potential for each image element by combining pairwise potentials defined between a child set of image elements being those image elements in the original image which are mapped to the image element concerned by the coarsening engine.

8. An apparatus as claimed in claim 5 wherein the processor is arranged to form an energy function for a given image in the pyramid such that pairwise potentials defined on image elements which have the same parent are taken into account; where the parent of an image element is an image element in a coarser level image of the pyramid which maps to that image element.

9. An apparatus as claimed in claim 5 wherein the processor is arranged to obtain the region of unlabelled image elements by using a measure of a confidence of the labeling.

10. An apparatus as claimed in claim 9 wherein the processor is further arranged to calculate and use min-marginals as the measure of the confidence of the labeling where the min-marginal of an image element is the energy value obtained by fixing the label of that image element to a specified label and optimizing the energy function over the remaining image elements.

11. An apparatus as claimed in claim 5 wherein the processor is arranged to obtain the region of unlabelled image elements by finding a first region of unlabelled image elements using a measure of confidence of the labeling; finding a second region of unlabelled image elements using a distance from a segmentation boundary; and combining the first and second regions.

12. An apparatus as claimed in claim 5 which is an image segmentation apparatus.

13. A method of labeling an image comprising:
at an input receiving a first image to be labeled;
arranging a coarsening engine to repeatedly reduce the resolution of an original image to form an image pyramid according to a scaling factor;
arranging a processor to form an energy function for a coarsest image in the pyramid directly from an energy function of the original image;
arranging an optimization engine to optimize the energy function for the coarsest image in the pyramid to obtain a labeling of the coarsest image;
arranging the processor to project the labeling onto the next-largest image in the pyramid and to identify, using a measure of confidence of the labeling, a plurality of image elements to be reassessed;

arranging the processor to form another energy function for the current image in the pyramid from the energy function of the original image;

arranging the optimization engine to optimize the another energy function only over the identified plurality of image elements to obtain a revised labeling; and using the processor and optimization engine to repeatedly: project the revised labeling, form another energy function and optimize that energy function; to use all the images in the pyramid and so produce a labeled version of the first image.

14. A method as claimed in claim 13 which further comprises arranging the processor to use min-marginals as the confidence measure, where the min-marginal of an image element is an energy value obtained by fixing the label of that image element to a specified label and optimizing the energy function over the remaining image elements.

15. A method as claimed in claim 13 which comprises arranging the processor to use color values of the image elements to provide a confidence measure.

16. A method as claimed in claim 13 where the processor is arranged to identify the image elements to be reassessed by finding a first plurality image elements to be reassessed using the measure of confidence of the labeling; finding a second plurality of image elements to be reassessed using a distance from a segmentation boundary; and combining the first and second plurality of image elements.

17. A method as claimed in claim 13 which comprises arranging the processor to form each energy function such that pairwise potentials defined on image elements which have the same parent are taken into account; where the parent of an image element is an image element in a coarser level image of the pyramid which maps to that image element.

18. An apparatus as claimed in claim 1 wherein the pairwise function comprises an edge feature function based on the difference in colors of neighboring pixels.

* * * * *